April 3, 1951  J. D. STRONG  2,547,545
MEANS FOR MEASURING THE OPTICAL PROPERTIES OF FILMS
Filed Dec. 24, 1947
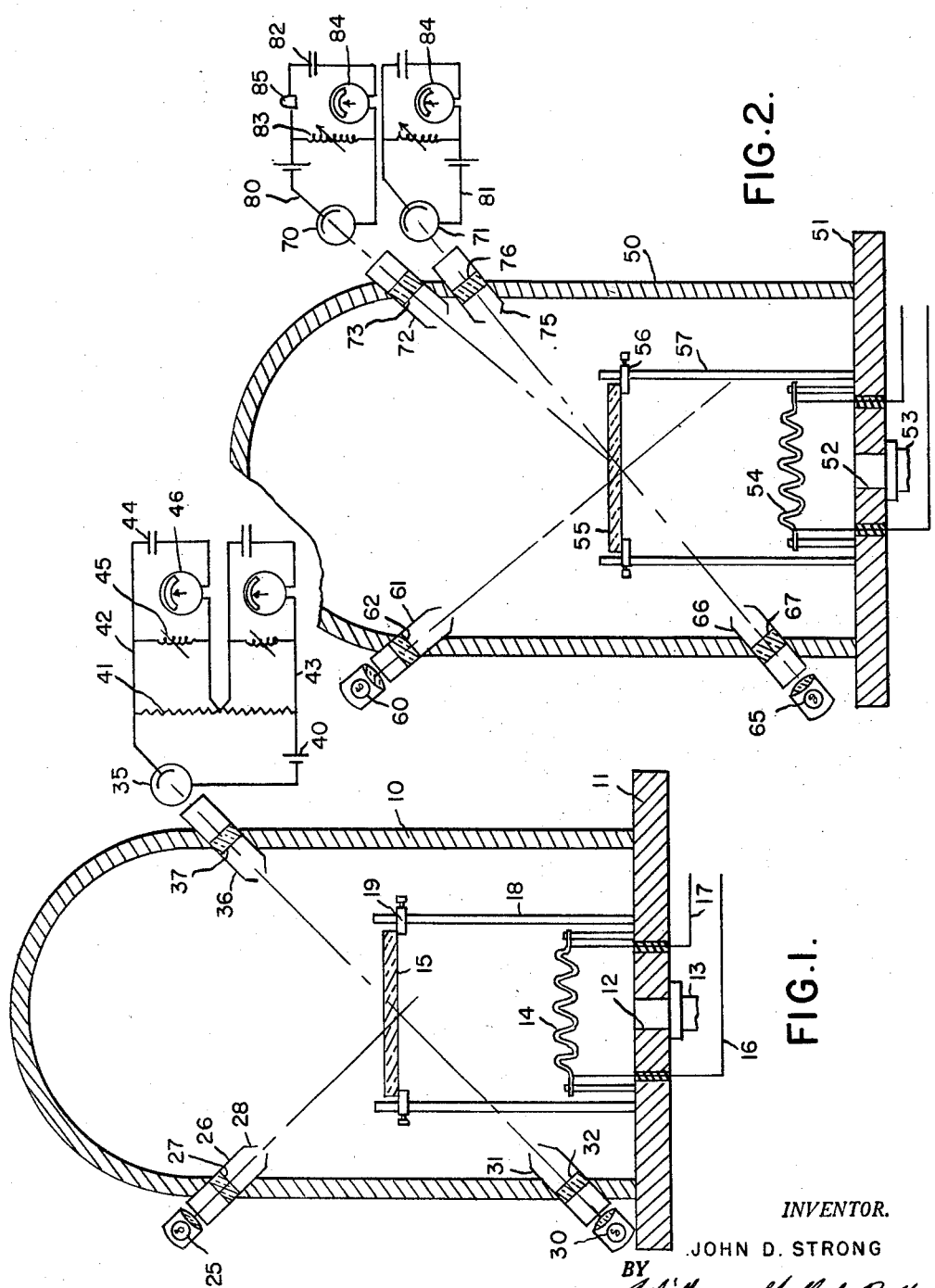
INVENTOR.
JOHN D. STRONG
BY
ATTORNEYS Patented Apr. 3, 1951

2,547,545

UNITED STATES PATENT OFFICE 2,547,545

MEANS FOR MEASURING THE OPTICAL PROPERTIES OF FILMS

John Donovan Strong, Baltimore, Md., assignor to Libbey-Owens-Ford Glass Company, Toledo, Ohio, a corporation of Ohio Application December 24, 1947, Serial No. 793,665

2 Claims. (Cl. 88—14)

The present invention relates to means for measuring the optical properties of films and more particularly for giving an instantaneous differential reading of light reflected from and transmitted through an optical film during its deposition.

The present invention finds one of its most useful fields in connection with deposition of optical films by thermal evaporation within a vacuum chamber. In depositing metallic or other types of optical films on transparent support bodies such as low reflection coatings, the simplest means of measuring the thickness of the film during deposition is by obtaining instantaneous readings of light reflected from and/or transmitted through the film.

In accordance with the present invention, one or two collimated light sources having predetermined frequencies are positioned adjacent the film and are adapted to transmit light to the film. The film will operate to split the light into a reflected beam and a transmitted beam. In some cases the transmitted beam may be absorbed by the material on which the film is deposited. If a single light source is employed and the transmitted light is split into a reflected beam and a transmitted beam, a photoelectric cell is positioned to receive either the reflected or the transmitted beam or if desired two photoelectric cells are employed, one of which receives the reflected beam and one of which receives the transmitted beam. In the event that two light sources are employed, the reflected beam from one source and the transmitted beam from the other source are employed. The transmitted beam and the reflected beam may follow identical paths, in which case the two light sources are of different predetermined frequencies and a single photoelectric cell is employed to receive both the reflected and the transmitted beam. On the other hand, the reflected and the transmitted beam from the two light sources may follow different paths, in which case a separate photoelectric cell is provided to receive each of the beams, and the frequencies of the light sources may in this case be identical.

Thus the several arrangements of light sources and photoelectric cells may be one of the following:

(1) A single light source is positioned at one side of the film and a pair of photoelectric cells are provided one at each side of the film in position to receive the split reflected and transmitted beams.

(2) A pair of light sources may be provided one at each side of the film in position such that the reflected beam from one source follows the path of the transmitted beam from the other source, so that a single photoelectric cell may be employed.

(3) A pair of light sources may be employed positioned at opposite sides of the film and a pair of spaced photoelectric cells are provided to receive the reflected beam from one source and the transmitted beam from the other source.

(4) A pair of light sources may be provided at one side of a film and a pair of photoelectric cells will be employed one at each side of the film to receive the reflected and the transmitted beam.

The photoelectric cell means is connected in a tuned circuit which is resonant with the frequency of the light to be measured. In case a single photoelectric cell is employed to receive both the transmitted and reflected beams of light, which beams are of a different fixed frequency, the photoelectric cell may be connected through suitable means, such for example as a resistance to two independently tunable circuits one of which is resonant to the frequency of the reflected beam and the other of which is resonant to the frequency of the transmitted beam. The tuned circuit may conveniently include a direct reading meter and if desired suitable current responsive means may be provided in the circuit to interrupt deposition of the optical film.

With the foregoing general description in mind, it is an object of the present invention to provide means for obtaining instantaneous readings of either transmitted or reflected light or both from an optical film during deposition of the film upon a transparent support body.

It is a further object of the present invention to provide means for measuring transmission or reflection value of an optical film, which means operates without being affected by general illumination or by light which may be emitted from the filament employed in thermal evaporation.

More particularly, it is a feature of the present invention to provide a light source of definite frequency in position adjacent a transparent body having an optical film in the process of deposition, in combination with photoelectric means in position to receive light either reflected from or transmitted by the film and a tunable electric circuit connected to the photoelectric cell, whereby the circuit may be tuned to the frequency of the light source and will therefore be responsive only to light of the predetermined frequency.

Other objects and features of the invention will become apparent as the description proceeds, especially when taken in conjunction with the accompanying drawings, wherein:

Figure 1 is a diagrammatic sectional view illustrating an arrangement in which a pair of light sources are employed in conjunction with a single photoelectric cell; and Figure 2 is a diagrammatic sectional view illustrating an arrangement in which a pair of light sources are employed with a like number of photoelectric cells.

Referring now to Figure 1, there is illustrated at 10 a vacuum jar or bell which may conveniently be formed of metal resting upon a support plate 11. The plate 11 has an opening therethrough as indicated at 12, connected by a conduit 13 to a suitable vacuum pump (not shown) for evacuating the interior of the jar. Carried by the support plate or base 11 is a filament adapted to support material to be evaporated therefrom and deposited upon a support body 15. The filament 14 is diagrammatically illustrated as connected to power leads 16 and 17.

Also carried by the base 11 and located within the interior of the evacuated jar 10 are a plurality of posts 18 having adjustable brackets 19 thereon for supporting the body 15 which may thereby be spaced from the filament 14 as desired. In the present instance the body 15 is illustrated as a transparent plate formed of glass or the like and the deposition of the material evaporated from the filament 14 therefore takes place on the underside of the body 15. It is to be understood that the invention is not limited to use with a transparent body since the invention is equally useful in measuring the reflective properties of an optical film deposited upon an opaque body.

As is well understood in the art, when heat is supplied by the filament 14 to the material to be evaporated, the material will deposit and form a film on the underside of the support body 15. It is desirable in order to effect accurate control of the deposition to obtain instantaneous readings of the transmission and/or reflection values of the film as it is deposited. For this purpose a first light source 25 is provided which as illustrated comprises a reflector and lens for directing light therefrom toward the support body 15. Located within an opening in the wall of the jar 10 is a tubular shield 26 carrying a transparent closure 27. The shield may at its inner end be tapered as indicated at 28 to shield the inner surface of the closure 27 from deposition of material evaporated from the filament 14. A second light source 30 is provided also associated with a reflector and lens and positioned adjacent a second tubular shield 31 provided with a transparent closure 32.

At the opposite side of the jar 10 is positioned a photoelectric cell 35 in position to receive light transmitted through a third tubular shield 36 which in turn is provided with a transparent closure 37. It will be observed in the embodiment being described that the light sources 25 and 30 are positioned so that the reflected and transmitted beams therefrom lie along identical paths. In this case the light sources 25 and 30 operate at different fixed frequencies which frequencies are preferably between 15 and 250 cycles per second but which in any event are frequencies to which electric circuits may be tuned to resonance. The light sources may be of any convenient or known type, such for example as ordinary filament lamps and evacuated gas tube lamps. As a further alternative, the light sources themselves may be identical and the frequencies referred to may be applied by mechanical choppers, such for example as rotating shutters operating to transmit pulsed light of different frequencies.

Preferably the power sources which supply current to the light sources should include a voltage regulator to insure steady intensity of the light. Finally, light supplied for reflection and transmission by the film to a single photoelectric cell may come from a single light source, located, for example, at the position of the light source 25 operating in conjunction with a reflector or the like positioned at the location of the light source 30. In this case, as will be readily appreciated, variations in intensity of the light source will not differentially affect the simultaneous readings of transmitted and reflected light.

The photoelectric cell indicated at 35 may be of either the gas tube type such as the well-known caesium cell or the photronic type such as the well-known copper oxide cell. However, in the circuits illustrated herein the gas tube type is shown, and accordingly power sources indicated herein as a cell source 40 of electric current are provided.

The photoelectric cell 35 has connected in series therewith a resistance 41, across portions of which are connected a first resonant circuit 42 and a second resonant circuit 43. These circuits are identical. These circuits will normally include suitable amplification means and the illustration hereof is merely diagrammatic, including a fixed capacity 44 and a variable inductance 45. Each circuit includes a current responsive indicator 46. The resonant circuits illustrated are greatly simplified and in practice the circuits may be any of the well-known circuits tunable to operate as highly tuned or narrow band-pass amplifying circuits so as to give substantial readings on the indicators 46.

With the foregoing arrangement it will be apparent that the tuned circuit 42 may be tuned to the frequency of the light source 30 and that therefore the indicator 46 in this circuit will be responsive only to light transmitted through the film from the light source 30. At the same time the circuit 43 may be tuned to the frequency of the light source 25. Accordingly, the meter provided in the circuit 43 will be solely responsive to light reflected by the film from the light source 25. The meters 46 will therefore give no reading as the result of general illumination around the bell 10 nor will they be at all responsive to light emitted from the filament 14, provided of course that the filament is not energized by alternating current whose frequency is equal to the frequency of one of the light sources 25 or 30.

Referring now to Figure 2, there is illustrated a second embodiment of the present invention, in which case a vacuum bell or jar 50 is supported on a plate 51 which plate is provided with an opening 52 for connection as by a conduit 53 with a suitable vacuum pump (not shown). Supported on the plate is a filament 54 for evaporating material therefrom and depositing the material on the underside of the support body 55. The support body 55 is carried on adjustable brackets 56 mounted on posts 57 so that the support body 55 may be positioned a predetermined distance from the filament 54. In this case a first light source 60 is provided outside the bell or jar and has suitable reflecting and refracting means for directing the light toward the support 55. Located within an opening in the wall of the bell or jar 50 is a tubular shield 61 provided with a transparent window or closure 62. A similar light source 65 is provided which has suitable reflecting and refraction means for directing light therefrom toward the support body 55. This light passes through a tubular shield 66 provided with a transparent closure or window 67. In this case the reflected and transmitted beams from the light sources 60 and 65 respectively are directed to two different photoelectric cells 70 and 71 respectively. For this purpose a tubular light shield 72 provided with a transparent window or closure 73 is positioned to receive the reflected beam from the light source 60. A second tubular shield 75 provided with a transparent closure or window 76 is positioned to receive the transmitted beam from the light source 65 and to permit its passage to the photoelectric cell 71. In this case the photoelectric cells 70 and 71 are connected in independent tunable circuits 80 and 81 respectively which may be identical and are herein diagrammatically represented as including a fixed capacity 82, a variable inductance 83 and a direct reading current responsive indicator 84.

In this case the light sources 60 and 65 may if desired be of the same frequency or they may be of different fixed frequencies.

In the circuit 80 there is diagrammatically illustrated at 85 a current responsive circuit controlling element which may be connected to the circuit including the filament 54. The arrangement may be such that when the reflected light to which the circuit 80 is responsive attains a predetermined value, the current responsive element 85 may operate to interrupt the circuit to the filament 54 and thereby terminate deposition of material on the support body 55. Obviously, a similar current responsive circuit controlling element may be placed in series with the other tuned circuits 42, 43 or 81.

While there are illustrated two of the possible arrangements of light sources and photoelectric cells referred to, it will be appreciated that these specific illustrations are not limiting and that the invention may be carried out with other specific arrangements. It may be considered that the optical film being deposited on the underside of the supports 15 or 55 serve to split the light from a single source into a reflected beam and a transmitted beam. In its broadest aspects therefore the invention contemplates the direction of light against an optical film which thereby operates to split the light into a reflected beam and a transmitted beam, in combination with photoelectric cell means in position to receive either or both of said beams. More specifically, the invention may be carried out with two light sources in combination with a single photoelectric cell, two light sources in combination with two photoelectric cells, or one light source in combination with two photoelectric cells. While the illustrated embodiments of the invention do not illustrate the situation in which a single light source is in position to direct a beam against the underside of an opaque support body for reflection to a single photoelectric cell, this arrangement is contemplated.

The present apparatus may be employed advantageously to measure the instantaneous reflection-transmission values of many types of optical film, such for example as partially transparent mirror films or the like. It may also be employed to measure the effectiveness of so-called low reflection films in the manner suggested in Patent 2,338,234 to Dimmick. In this case it is most convenient to employ a light source and photoelectric cell so positioned relative to each other as to cause light from the source to be reflected to the photoelectric cell. As the low reflection coating approaches its critical thickness the intensity of the reflected beam diminishes. The present method may also be employed in depositing low reflection coatings in an arrangement in which light from the source is transmitted through the low reflection film to the photoelectric cell. In this case the optimum coating is present when the transmitted beam reaches a maximum intensity since a low reflection film operates to increase transmission at the same time as it reduces reflection.

The drawings and the foregoing specification constitute a description of the improved means for measuring the optical properties of films in such full, clear, concise and exact terms as to enable any person skilled in the art to practice the invention, the scope of which is indicated by the appended claims.

What I claim as my invention is:

1. Means for determining the light transmission-reflection properties of an optical film during its deposition by thermal evaporation in a vacuum, while avoiding errors or the necessity for correction due to general illumination or light emitted from the filament employed in evaporation, which comprises a vacuum bell, a support in said bell for carrying a transparent plate to be provided with a film, a first light source of a first definite frequency to which an electric circuit may be tuned to resonance, means at one side of the plate carried by said support and beyond an edge of the plate for directing a beam of light from said first source obliquely against one surface of the film, a second light source of a second definite frequency different from the frequency of said first source but also of a frequency to which an electric circuit may be tuned to resonance, said two definite frequencies being different from the frequency of current employed in general illumination or in the filament, means at the other side of the plate carried by said support and beyond the same edge of the plate for directing a beam of light from said second source obliquely against the other surface of the film, said sources being positioned such that light transmitted through the film from one source is coincident with light reflected by the film from the other source, a photo-electric cell at the said other side of the support and beyond the opposite edge of the plate in position to receive said reflected and transmitted light, separate individually tuned circuits connected to said cell, and a current responsive means in each of said tuned circuits.

2. Structure as defined in claim 1 in which said light sources and means for directing light and said photo-electric cell include light transmitting closures in the wall of said bell.

JOHN DONOVAN STRONG.

REFERENCES CITED

The following references are of record in the file of this patent:

UNITED STATES PATENTS

| Number | Name | Date |
|---|---|---|
| 1,816,047 | Kenfel | July 28, 1931 |
| 1,926,824 | Stogoff | Sept. 12, 1933 |
| 2,114,867 | Wilson | Apr. 19, 1938 |
| 2,215,211 | Devol | Sept. 17, 1940 |
| 2,216,575 | Seinfeld | Oct. 1, 1940 |
| 2,222,429 | Briebecher | Nov. 19, 1940 |
| 2,234,329 | Wolff | Mar. 11, 1941 |
| 2,239,452 | Williams et al. | Apr. 22, 1941 |
| 2,244,826 | Cox | June 10, 1941 |
| 2,290,606 | Burnett | July 21, 1942 |
| 2,350,820 | Rettinger | June 6, 1944 |
| 2,428,868 | Dimmick | Oct. 14, 1947 |
| 2,442,910 | Thomson | June 8, 1948 |
| 2,449,783 | Laidig et al. | Sept. 21, 1948 |